United States Patent [19]

Tulman

[11] Patent Number: 4,806,309

[45] Date of Patent: Feb. 21, 1989

[54] TIN BASE LEAD-FREE SOLDER COMPOSITION CONTAINING BISMUTH, SILVER AND ANTIMONY

[75] Inventor: Stanley Tulman, Charlotte, N.C.

[73] Assignee: Willard Industries, Inc., Charlotte, N.C.

[21] Appl. No.: 141,057

[22] Filed: Jan. 5, 1988

[51] Int. Cl.$^4$ .................................................. C22C 13/02
[52] U.S. Cl. ................................... 420/562; 420/561
[58] Field of Search ................................. 420/561, 562

[56] References Cited

U.S. PATENT DOCUMENTS 3,607,253  9/1971  Cain et al. ........................... 420/562
4,670,217  6/1987  Henson et al. ...................... 420/562

*Primary Examiner*—L. Dewayne Rutledge
*Assistant Examiner*—Robert L. McDowell
*Attorney, Agent, or Firm*—Shefte, Pinckney & Sawyer

[57] ABSTRACT

A lead-free solder composition of approximately 90% to 95% by weight tin, approximately 3% to 5% by weight antimony, approximately 1% to 4.5% by weight bismuth, and approximately 0.1% to 0.5% by weight silver.

3 Claims, No Drawings

TIN BASE LEAD-FREE SOLDER COMPOSITION CONTAINING BISMUTH, SILVER AND ANTIMONY

The present invention relates to a lead-free solder composition, and more particularly to a lead-free solder composition containing bismuth.

The predominant solder composition in use for years has been the tin-lead type, which has proven to provide the most desirable results in most common applications. However, the use of lead has become undesirable and has even been outlawed, particularly for use in constructing or repairing potable water systems. As a result, attempts have been made to eliminate lead from solder compositions and substitute other elements to obtain similar results.

Tin-antimony solder compositions have been used in the past, for example 95% by weight tin and 5% by weight antimony, but such compositions have higher melting points, approximately 450° F., than tin-lead solder compositions that could be proportioned for melting in the range of 360° F.

Recently a solder composition of tin, copper and silver has been developed, typically 95.5% by weight tin, 4% by weight copper, and 0.5% by weight silver. However, this solder composition has an undesirably high melting point in the range of approximately 440° F. and is undesirably hard.

Another solder composition that has recently become available is a composition of tin, antimony, zinc and silver, typically 95% by weight tin, 3% by weight antimony, 1.5% by weight zinc and 0.5% by weight silver. This composition results in a somewhat lower melting temperature in the range of approximately 419° F., but the zinc presents a problem in that it tends to foam and create air pockets, resulting in a solder that is too porous to provide consistently satisfactory results.

By the present invention, it has been discovered that bismuth can be used in a tin, antimony and silver solder composition in a range of approximately 1.0% to 4.5% by weight bismuth. This use of bismuth lowers the melting point down to as low as approximately 424° F. with good soldering results. In addition, bismuth is considerably more expensive than zinc.

Bismuth has been known to be used in very small amounts in tin alloys to reduce the melting temperature, particularly for fuse allows. Bismuth is found in some solder compositions, along with other extraneous elements, but in amounts typically no more than about 0.25% by weight, which has little or no effect on the characteristics of the solder composition. Thus, bismuth has not been used in solder compositions in the percentage range of the present invention.

By the present invention, a solder composition closely approximating the 95% tin, 5% antimony composition is obtained with somewhat similar advantages, but without the high melting range and with an extended pasty state range. Furthermore, the expected weakening due to the use of bismuth is overcome by including silver for added tensile and shear strength. In the preferred embodiment, bismuth constitutes approximately 1.5% of the weight of the solder.

Preferably, the solder composition contains approximately 90% to 95% by weight tin, approximately 3% to 5% by weight antimony, approximately 1% to 4.5% by weight bismuth, and approximately 0.1% to 0.5% by weight silver.

The following experiments have been performing according to the preferred embodiments of the present invention:

EXPERIMENT NO. 1

A solder composition was prepared according to the following proportions by weight:
Tin—95%,
Antimony—3%,
Bismuth—1.5%,
Silver—0.5%.

A chemical analysis of the above solder composition resulted in the following percentage proportions by weight:
Tin—balance,
Antimony—3.2%,
Bismuth—1.49%,
Silver—0.48%,
Lead—0.060%,
Arsenic—0.036%,
Copper—0.034%,
Nickel—0.0066%,
Iron—0.0060%,
Cadmium—Less than 0.005%,
Indium—Less than 0.003%.

Gold, aluminum and zinc were not detected. The technique used was capable of detecting 0.005% or less of these elements had they been present.

The aforementioned solder composition was heated and reached a melting transition from solid state to a plastic-like state at a temperature of 424° F. It passed from a soft plastic-like state at 437° F. to a liquid state at 455° F. The tensile strength was found to be 7,400 psi, and a wire of the composition 0.124 inches in diameter sustained a double shear load of 235 pounds and a single shear load of 110 pounds. The wire tested under a 25 gram load to a Knoop Hardness No. of 20.4–22.0.

EXPERIMENT NO. 2

A solder composition was made using the following percentage by weight proportions:
Tin—90%,
Antimony—5%,
Bismuth—4.5%,
Silver—0.5%.

The composition became plastic at 442° F. and transformed from plastic to liquid in the range of 442° F. to 453° F. While the melting temperature range was not as desirable as with the composition of Experiment No. 1, a good joint was obtained without discoloration and with the use of a minimum amount of solder composition.

EXPERIMENT NO. 3

For comparison purposes a solder composition was prepared according to the following percentage by weight proportions:
Tin—98%,
Antimony—1.5%,
Bismuth—0.25%,
Silver—0.25%.

A joint was prepared using this composition, but was found to be unsatisfactory. Rolling and lumping of the solder was experienced and the fluidity was not satisfactory. There also was some discoloration. The composition became plastic at 447° F. and transformed from plastic to liquid in the range of 447° F. to 455° F.

The foregoing experiments indicate that satisfactory soldering results can be obtained using the solder compositions of the present invention with bismuth in the percentage by weight portions indicated. It should be understood that the range of the percentage of bismuth can vary somewhat from the amounts in the foregoing Experiments Nos. 1 and 2 and obtain acceptable results, although a significant variation would reduce the acceptability. Similarly, it should be understood that the amount of silver can be varied as desired, provided the amount that is used results in satisfactory strength of the solderded joint. For example, a solder content of 0.1% to 0.5% by weight would be expected to provide satisfactory results.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangement, the present invention being limited only by the claims appended hereto and the equivalents thereof.

I claim:

1. A lead-free solder composition consisting essentially of tin, antimony, bismuth and silver, wherein the percentage weight proportions are:
   Tin—Approximately 90–95%,
   Antimony—Approximately 3–5%,
   Bismuth—Appoximately 1–4.5%,
   Silver—Approximately 0.1–0.5%.

2. A lead-free solder composition according to claim 1 and wherein the percentage weight proportions are:
   Tin—Approximately 95%,
   Antimony—Approximately 3%,
   Bismuth—Approximately 1.5%,
   Silver—Approximately 0.5%.

3. A lead-free solder composition according to claim 1 and wherein the percentage weight proportions are:
   Tin—Approximately 90%,
   Antimony—Approximately 5%,
   Bismuth—Approximately 4.5%,
   Silver—Approximately 0.5%.

* * * * *

UNITED STATES PATENT AND TRADEMARK OFFICE
CERTIFICATE OF CORRECTION

PATENT NO. : 4,806,309

DATED : February 21, 1989

INVENTOR(S) : Stanley Tulman

It is certified that error appears in the above-identified patent and that said Letters Patent is hereby corrected as shown below:

Column 1, line 48, "allows" should read -- alloys --.

Column 2, line 1, "performing" should read -- performed --.

Column 3, line 12, "solderded" should read -- soldered --.

Signed and Sealed this

Eleventh Day of September, 1990

Attest:

HARRY F. MANBECK, JR.

*Attesting Officer*  *Commissioner of Patents and Trademarks*